Figure 1:
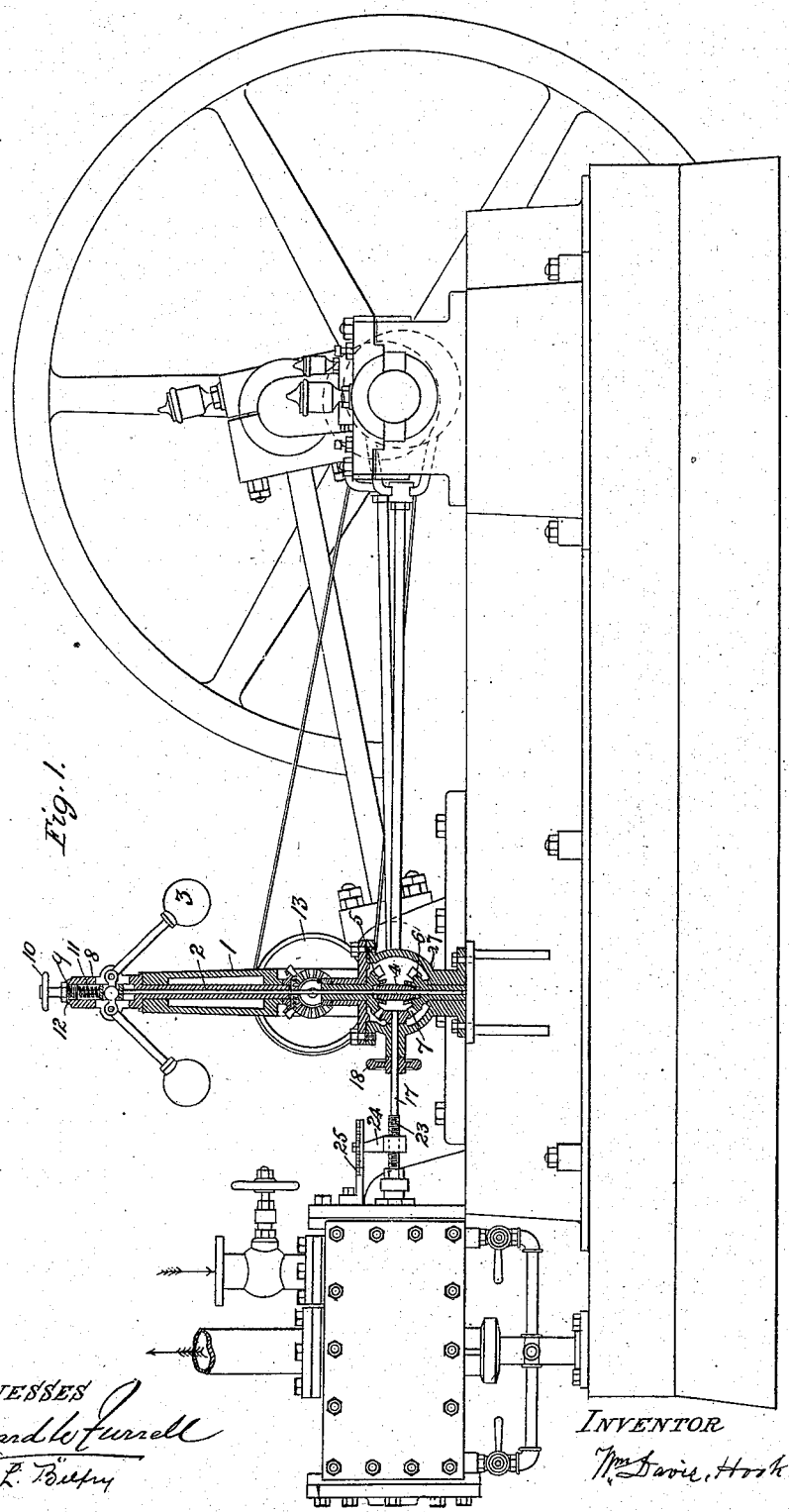

No. 692,785. Patented Feb. 4, 1902.
W. D. HOOKER.
CUT-OFF GEAR FOR STEAM ENGINES.
(Application filed Mar. 16, 1901.)
(No Model.) 3 Sheets—Sheet 1.

WITNESSES
Edward W. Furrell
Geo. L. Belfry

INVENTOR
Wm Davis Hooker

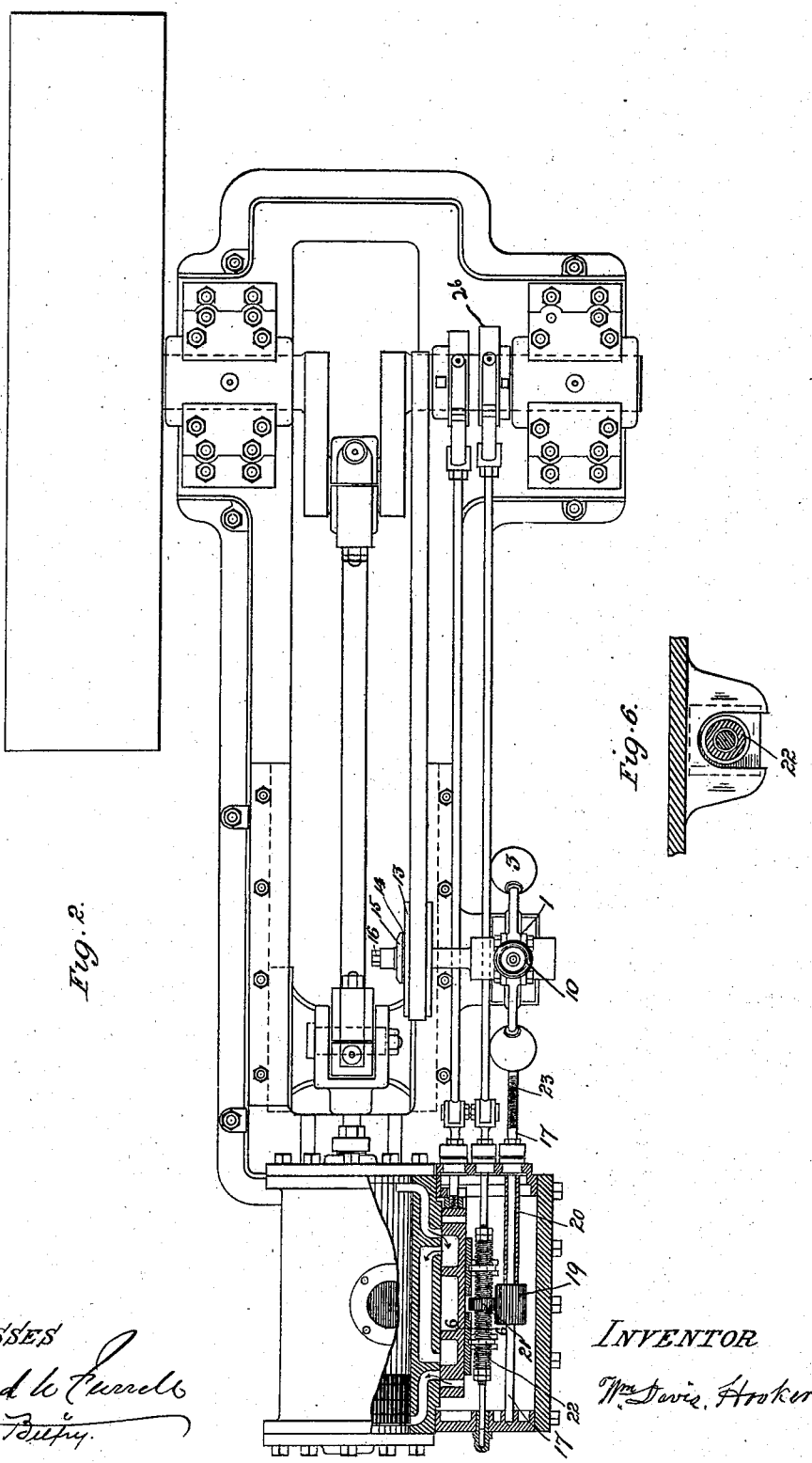

No. 692,785. Patented Feb. 4, 1902.
W. D. HOOKER.
CUT-OFF GEAR FOR STEAM ENGINES.
(Application filed Mar. 16, 1901.)
(No Model.) 3 Sheets—Sheet 3.
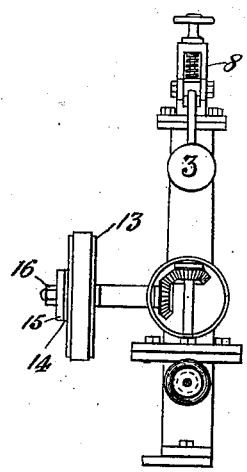
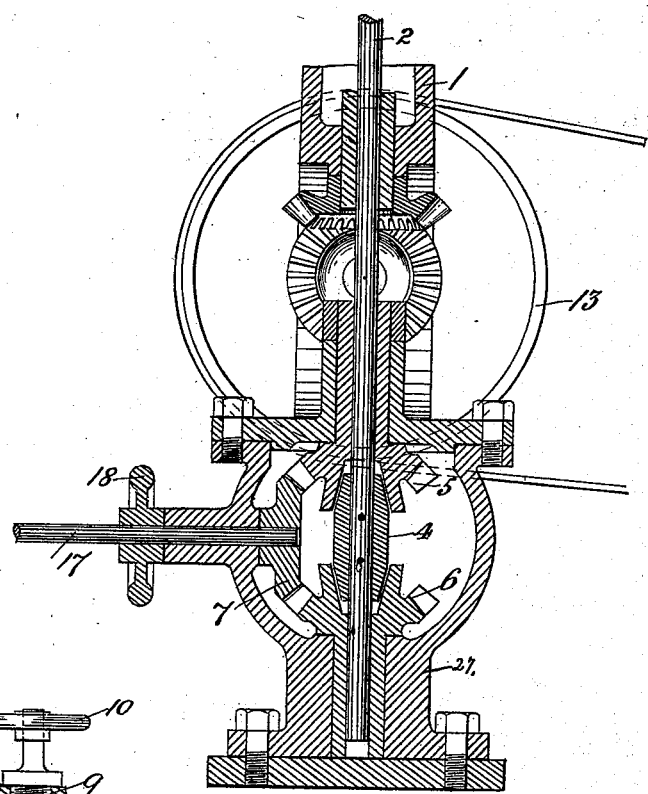
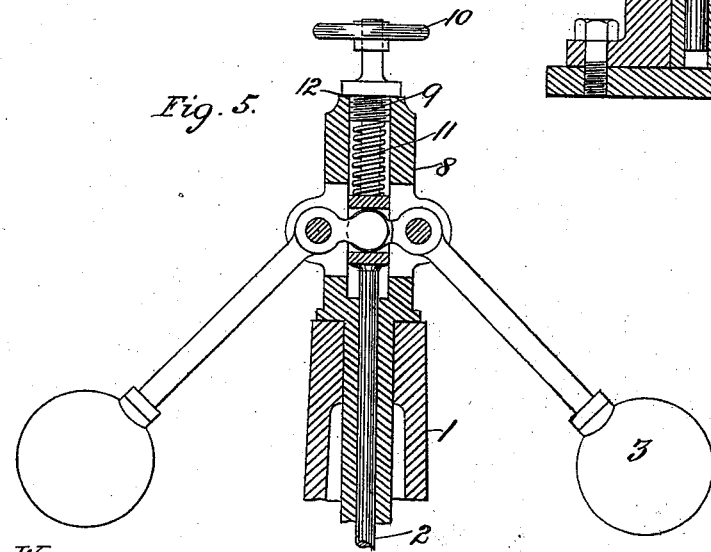
WITNESSES
Edward L. Furrell
Geo. L. Belfry.
INVENTOR
Wm Davis Hooker

UNITED STATES PATENT OFFICE.

WILLIAM DAVIS HOOKER, OF ST. LOUIS, MISSOURI.

CUT-OFF GEAR FOR STEAM-ENGINES.

SPECIFICATION forming part of Letters Patent No. 692,785, dated February 4, 1902.

Application filed March 16, 1901. Serial No. 51,541. (No model.)

*To all whom it may concern:*

Be it known that I, WILLIAM DAVIS HOOKER, a citizen of the United States, residing at the city of St. Louis, in the State of Missouri, have invented certain new and useful Improvements in Steam-Cut-Off Gear for Steam-Engines, of which the following is a specification.

My invention relates to cut-off mechanism of steam-engines; and the nature of my invention consists in providing and connecting suitable mechanical attachments or devices to a speed regulator or governor of a steam-engine and its cut-off valves, whereby the steam at boiler-pressure is cut off from the steam-engine cylinder at any point of the stroke of the engine-piston, thus producing even and steady revolutions of the crank-shaft of the engine throughout the variable loads driven by the engine, the steam acting expansively, in conjunction with the momentum stored up in the fly-wheel, to finish up the strokes of the engine; also, in providing an index operated by the cut-off gear, so that the different points of cut-off can be seen; also, in providing, in connection with the cut-off gear, a hand-wheel to adjust the cut-off of the valves of the engine should it be required; also, in providing gears of different diameters connecting the valve-gear with the cut-off valves of an engine, so that the right and left hand screw that adjusts the positions of the cut-off valves can be reduced in speed as compared with the speed of the cut-off shaft driven by the governor; also, in providing wider teeth in the gear of the cut-off shaft than in the gear of the right and left hand screw, so that in the reciprocations of the screw the teeth of both gears will be in contact, and in certain devices applied to and connected with a governor of usual construction, all of which will hereinafter be more fully described.

Reference being had to the drawings accompanying this specification, in which like numerals represent like parts in all the views, Figure 1 is a side elevation of a steam-engine, showing my improved cut-off-valve gear connecting a speed regulator or governor of usual construction to the cut-off valves of the engine, the governor and its subbase 27 being shown in vertical section. Fig. 2 is a plan of the engine, showing its crank-shaft, fly-wheel pulley, eccentrics, and connecting-rods, such as are usually employed in steam-engines, the steam-chest and its valves being shown in section in the plane of the center lines of the valve-rods, part of the steam-cylinder being broken away to show its steam and exhaust ports and the steam-piston, the piston being represented in this view as just commencing its stroke. Fig. 3 is an end elevation of the governor; Fig. 4, an enlarged vertical section of the governor and its subbase, showing the driving clutch-gears and their clutch and driven gear connected to a governor of ordinary construction, the top of the governor being broken away and shown in Fig. 5; Fig. 6, a view of one cut-off valve and its lug, taken on line 6 6, Fig. 2, in which lug is fitted to slide easily a nut of the right and left hand adjusting valve-screw.

1 is a governor of ordinary construction mounted on subbase 27; 2, the governor-spindle, revolved and reciprocated by motion of the governor-balls 3; 4, the clutch which is fastened to the spindle 2; 5 6, the clutch driving-gears, the gear 5 being journaled in its bearing formed in the base of the governor-stand and gear 6 likewise journaled in a bearing in the bottom of the subbase. These gears mesh into the driven gear 7. The top of the subbase 27 is bored out a little larger than these gears to admit of the gears being easily inserted into the subbase. The base of the governor proper is turned and faced to fit this subbase and is secured to the base so as to bring the governor-spindle in alinement with holes in the center of these gears, through which holes the spindle loosely passes.

8 is a cap secured by screws to the top of the governor. This cap is open on its two opposite sides. A screw-thread is formed in its upper end, and a screw 9 engages with this thread. A hand-wheel 10 serves to operate the screw. The end of this screw is of a smaller diameter than the screw. A coil-spring 11 encircles this small end of screw, one end of which rests on the top of the governor-spindle. The other end comes in contact with shoulder of the screw when the screw is set down. This screw when set down to its shoulder 12 will bring the governor-balls into the position as shown in Figs. 1 and 5, when the clutch 4 will be out of contact with the pockets of the driving clutch-gears, and these gears will be while the clutch is in that position motionless, the object being should the governor be out of order or its driving-belt break the cut-off valves could be adjusted by hand while the governor is put in order. The governor-balls, their arms, and driving-pulley are of such proportions as to control the motion of the engine at high speed, as is usually called "six hundred piston-feet" speed per minute, and while the governor is running the engine could not increase its speed; but as very often a high and moderate speed at different times is desired I have designed the coil-spring and its screw so that this spring can be compressed a little by the screw, which is the equivalent of using lighter governor-balls, and the engine will be retarded in speed, as desired.

13 is a friction-pulley which fits loosely on the driving-shaft of the governor; 14, an elastic disk fastened to the pulley; 15, disk-plate. The hole in its hub is grooved and slides on a feather inserted in the shaft.

16 is a nut to tighten up friction. The friction-disk is adjusted just tight enough to drive the governor. Should the governor get out of order, as in case of breakage or excessive friction, the pulley would slip on the friction-disk plate, and then the governor-clutch could be thrown out of connection with the cut-off gear and the gear be adjusted by hand, as before described.

17 is the cut-off shaft, having hand-wheel 18 fastened thereon, and driven gear 7 keyed onto its end. This shaft passes through its stuffing-box into the steam-chest of the engine, its opposite end journaled in a bearing in the chest. The gear 19 is fastened to this shaft. A sleeve 20 is fitted loosely over this shaft between the gear and the stuffing-box, so the shaft can have an oscillating or rotary motion, but no reciprocating motion, thereby reducing the friction of this shaft to the minimum. This gear 19 has wider teeth than the gear 21, so that the teeth of gear 21, which is formed on the right and left hand screw and reciprocated by an eccentric from the engine-shaft, will slide in between the teeth of gear 19, and the screw 22 can be revolved or oscillated and not interfere with the reciprocating movements of the screw.

The engine-cylinder has steam and exhaust ports and a slide-valve with steam-ports through it near its ends and exhaust-cavities and cut-off valves fitted to it, operated by a right and left hand screw and its nuts, as is well known and in use.

On the shaft 17, near its stuffing-box, is formed a screw-thread 23. An index-arm 24 is screw-threaded in its hub and engages with the screw-thread on the shaft. The index-arm passes loosely through a slot in index-piece 25, which is fastened to the steam-chest, and as the cut-off shaft is rotated or oscillated by the governor the points of cut-off of the steam in the engine-cylinder can be seen. As the governor-spindle is raised or lowered by the centrifugal action of the governor-balls the friction-clutch will engage with either one or the other of the friction-pockets in the hubs of the driving friction-gears, which are geared to the driven gear. This will cause the cut-off shaft to revolve or oscillate in one or the other direction, and these motions being transferred to the right and left hand screw, that controls the position of the cut-off valves, and eccentric, that gives these valves a reciprocating motion, will cut the steam off from the steam-cylinder at any point of the stroke of the steam-piston, when the expansion of this steam and the momentum of the fly-wheel of the engine will finish up the strokes of the engine, thus giving steady and even revolutions to the engine-shaft and effecting a large saving in fuel for steam.

Should the engine for lack of steam-pressure or overload be retarded in its revolutions below its normal speed, the governor-balls will fall or come nearer together. The right and left hand screw, connected, as shown, with the governor, will draw the cut-off valves toward each other. When the edges of these valves meet, the friction-clutch 4 will slip in the friction-pocket of the driving-gear 5, and the cut-off shaft 17 will cease to revolve until the engine again resumes its normal speed, when the governor-balls 3 will raise or separate farther from each other and the clutch 4 will be lowered and engaged in the pocket of driving-gear 6, when the cut-off shaft 17 will be revolved in the opposite direction, causing the right and left hand screw 22 to move the cut-off valves away from each other and cut off the steam from the engine-cylinder, and the engine will then maintain its normal speed.

The governor-balls and the leverage of their arms are made of such a weight and proportion, and also the diameter and taper of the clutch 4, as to drive the cut-off valves under all conditions of pressure and friction of the cut-off valves; but as the resistance increases when the cut-off valves meet each other the clutch 4 will slip in its clutch-pocket until the engine resumes its normal speed.

The right and left hand screw 22 is fitted to revolve loosely on the cut-off-valve rod. Nuts and check-nuts on this rod prevent lateral movement of this screw on the rod. The end of this valve-rod is journaled to slide in a bearing fitted in the steam-chest. The outer end of the valve-rod is connected by an eccentric-rod to eccentric 26 to give the cut-off valves a reciprocating motion.

I am aware that taper and flat friction of dog-clutches applied to pulleys, gears, &c., are well known, and I do not claim, broadly, such clutches; also, that springs applied to governors to accelerate the motion of engines are well known, and I do not claim such a device broadly. Modifications within wide limits can be made without departing from the spirit or sacrificing the advantages of my invention—as, for instance, the governor can be geared direct to the crank-shaft and various devices of cut-off valves could be used, all of which will readily suggest themselves to a practical engineer.

Having thus described my invention, what I do claim, and desire to secure by Letters Patent, is—

1. In a cut-off gear for steam-engines, the combination with the cut-off-valve rod of a sleeve adapted to rotate on the said rod, and having a right and left handed screw engaging the cut-off valves, and having a toothed wheel engaged by a toothed wheel on the cut-off shaft, controlled by the governor, substantially as described.

2. In a cut-off gear for steam-engines the combination with the cut-off-valve rod of a sleeve adapted to rotate on the said rod, and having a right and left handed screw engaging the cut-off valves, and having a toothed wheel engaged by a toothed wheel on the cut-off shaft, and means for rotating the said shaft by hand, substantially as described.

3. In a cut-off gear for steam-engines, the combination with the cut-off-valve rod of a sleeve adapted to rotate on the said rod, and having a right and left handed screw engaging the cut-off valves, and having a toothed wheel engaged by toothed wheel on the cut-off shaft, controlled by the governor, the said shaft having a screw-threaded portion engaging the correspondingly-threaded portion of the arm for moving the said arm along a slotted index-piece projecting from the valve-casing, substantially as described.

4. In a cut-off gear for steam-engines the combination of the cut-off shaft 17 connecting the governor to the right and left hand screw 22 and its valve-rod connected to eccentric 26 by mechanism as shown of the cap 8 screw 9 having shoulder 12 and hand-wheel 10, substantially as described.

5. In a cut-off gear for steam-engines the combination of the cut-off shaft 17 connecting the governor to the right and left hand screw 22 and its valve-rod connected to eccentric 26 by mechanism as shown, of the cap 8, screw 9, wheel 10 and coiled spring 11, substantially as described.

6. In a cut-off gear for steam-engines the combination of the shaft 17 connecting the governor to the right and left hand screw 22 and its valve-rod to eccentric 26 by mechanism as shown of the governor-pulley 13 disk 14, disk-plate 15 and nut 16, substantially as described.

7. In the cut-off gear for steam-engines the combination with the shaft 17 connected to the governor and the cut-off-valve rod connected to eccentric 26 by mechanism as shown, of the gear 19 fast to the cut-off shaft in the steam-chest and connecting with gear 21 of the right and left hand screw 22, the gear 19 having wider teeth than the gear 21, substantially as described.

WM. DAVIS HOOKER.

Witnesses:
GEO. L. BELFRY,
EDWARD A. FURRELL.